United States Patent
Benarous

(10) Patent No.: US 10,965,227 B2
(45) Date of Patent: Mar. 30, 2021

(54) ELECTRIC MOTOR

(71) Applicant: Goodrich Actuation Systems Limited, Wolverhampton (GB)

(72) Inventor: Maamar Benarous, West Midlands (GB)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 0 days.

(21) Appl. No.: 16/532,923

(22) Filed: Aug. 6, 2019

(65) Prior Publication Data
US 2020/0059172 A1   Feb. 20, 2020

(30) Foreign Application Priority Data
Aug. 17, 2018   (EP) ..................... 18189479

(51) Int. Cl.
*H02P 3/22* (2006.01)
*F16D 63/00* (2006.01)

(52) U.S. Cl.
CPC .............. *H02P 3/22* (2013.01); *F16D 63/002* (2013.01)

(58) Field of Classification Search
CPC ...... H02P 3/22; H02P 3/12; H02P 3/00; H02P 6/00; F16D 63/002
USPC ........................ 318/379, 375, 362
See application file for complete search history.

(56) References Cited

U.S. PATENT DOCUMENTS

| | | | |
|---|---|---|---|
| 6,184,604 B1 | 2/2001 | Takano et al. | |
| 8,493,011 B2* | 7/2013 | Wichert | H02P 6/185 318/400.33 |
| 8,890,448 B2* | 11/2014 | Putkinen | B66B 1/32 318/371 |
| 9,306,478 B2* | 4/2016 | Kischka | H02P 3/18 |
| 2005/0104455 A1 | 5/2005 | Migliori | |
| 2016/0130089 A1 | 5/2016 | Dimitrov et al. | |

FOREIGN PATENT DOCUMENTS

| | | |
|---|---|---|
| EP | 2665177 A2 | 11/2013 |
| EP | 2665177 A3 | 11/2013 |
| EP | 2687396 A1 | 1/2014 |
| FR | 2934529 A1 | 2/2010 |
| JP | 2003164002 A | 6/2003 |

OTHER PUBLICATIONS

Extended European Search Report for International Application No. 18189479.1 dated Dec. 6, 2018, 9 pages.

* cited by examiner

*Primary Examiner* — David Luo
(74) *Attorney, Agent, or Firm* — Cantor Colburn LLP

(57) ABSTRACT

An electric motor comprising: a stator; a rotor having a magnet mounted thereto; an electric circuit comprising a plurality of phases or windings for driving rotation of a rotor, in a drive mode; and a controller configured to control the electric circuit, in a motor braking mode, to short at least one of said phases or windings such that the magnet is able to generate a braking current in the shorted phase or winding wherein the motor is configured to operate at a rated current in the drive mode and to have a reactance such that the amplitude of the braking current is the same or lower than the amplitude of the rated current.

16 Claims, 2 Drawing Sheets

ELECTRIC MOTOR

FOREIGN PRIORITY

This application claims priority to European Patent Application No. 18189479.1 filed Aug. 17, 2018, the entire contents of which is incorporated herein by reference.

FIELD

The present disclosure relates generally to electric motors and the control of such motors when the power supply to the motor is switched off or, for example, when it is required to brake the motor under controlled conditions.

BACKGROUND

Electric motors are known in which wire windings are provided on the stator and a permanent magnet is provided on the rotor. When it is desired for the motor to drive a load connected to the rotor, an electrical power supply provides a current to the windings (e.g. using a three-phase voltage supply) such that the windings generate magnetic fields that interact with the magnetic field of the magnet on the rotor, thus causing the rotor to rotate and drive the load.

It is also known to operate such motors as an electrical generator when the power supply to the motor is switched off, e.g. during regenerative braking. In such modes, once the power supply has been switched off there is a period of time in which the rotor continues to rotate, as it slows down. During this period, the magnetic field of the permanent magnet on the rotor rotates passed the windings on the stator, causing a voltage to be induced in the windings, which will generate an electrical current. The power generated by this electrical current may then be stored in a battery, or used to power other devices in a system connected to the motor.

However, it is not always desired for the motor to act as a generator when the power supply to the motor is switched off. For example, in some aerospace applications it is not desired for electrical currents to be generated when the power supply to the motor is powered down (e.g. during slowing or braking of the rotor), since such currents would then undesirably be transmitted to other parts of the electrical network that is connected to the motor. In order to mitigate this problem it is known to provide a resistor in the electrical network in order to dissipate the electrical power generated during slowing or braking of the motor. However, in order to do this the resistor is required to be relatively large and so adds size and weight to the system.

SUMMARY

From a first aspect the present disclosure provides an electric motor comprising a stator; a rotor having a magnet mounted thereto; an electric circuit comprising a plurality of phases or windings for driving rotation of the rotor when, in a drive mode, the phases or windings receive a current from an electrical power supply; and a controller configured to control the electric circuit, in a motor braking mode, to electrically disconnect the phases or windings from the electrical power supply and short at least one of said phases or windings such that the magnet is able to generate a braking current in the shorted phase or winding; wherein the motor is configured to operate at a rated current in the drive mode and to have a reactance such that the amplitude of the braking current is the same or lower than the amplitude of the rated current.

The motor reactance is relatively high and limits the braking current to being no more than the rated current. As such, the electric circuit of the motor is prevented from being damaged by a high braking current. For example, the electric circuit comprises an inverter having switches that open and close during the drive mode, and that may be selectively closed in the braking mode to short the phases or windings, and these switches are protected from being overheated by limiting the braking current as described herein.

The rated current is the current that the motor is configured to operate at in the drive mode. The electrical circuit of the motor is configured such that it will not be damaged when a current at or below the rated current is (continuously) flowing through it.

The reactance is the level of opposition to a change in current or voltage, e.g. due to its inductance.

The motor may be configured such that the rotor rotates at a first speed when the motor receives any given current from the electrical power supply, in the drive mode. The reactance may be such that rotation of the rotor substantially at the first speed in said braking mode generates said braking current having an amplitude that is at or below said given current.

The phases or windings that are shorted in said braking mode may have said reactance that limits the amplitude of the braking current to being the same or lower than that of the rated current.

As described above, the motor is configured such that the reactance is relatively high, thus limiting the amplitude of the braking current. The level of reactance may be set to the desired value in any of the known manners, which will therefore not be discussed in detail herein. For example, the number of turns in the phases or windings (that are shorted in said braking mode) may be selected to provide these phases or windings with a reactance such that the amplitude of the braking current is the same or lower than the amplitude of the rated current.

The magnet may be a permanent magnet.

The use of a permanent magnet on the rotor provides a relatively high power density (i.e. a relatively high power for its size/weight).

The phases or windings may be mounted on the stator.

The motor may comprise a motor drive unit configured to be operable in a motor drive mode in which the windings are electrically connected to the electrical power supply so as to receive a current from the electrical power supply and generate magnetic fields that act on a magnetic field of the magnet mounted to the rotor, thereby causing the rotor to rotate. The controller may be configured so as to not short any phases or windings in the motor drive mode. The motor drive unit is also configured to be operable in the braking mode in which the phases or windings are electrically disconnected from the electrical power supply such that the electric power supply does not supply a current to the windings, thereby not driving rotation of the rotor.

In the braking mode the rotor, and hence the magnet thereon, continues to rotate under its own inertia until the rotor slows to a stop. Rotation of the rotor, and hence magnet, passed the shorted phases or windings generates the braking current in these phases or windings.

The motor may be configured such that the braking current generates a magnetic field that interacts with a magnetic field of said magnet so as to cause braking of a rotation of the rotor.

The motor may be configured to control the electric circuit to be operable in a first braking mode in which a first number of the phases or windings is, or are, shorted; and to be operable in a second braking mode in which a second greater number of the phases or windings are shorted.

The first number of phases or windings is at least one winding. For example, the controller may be configured to short two phases or windings in the first braking mode and more than two phases or windings in the second braking mode.

The shorting of a winding comprises forming a closed circuit in which that winding is located, without an electric power supply in that closed circuit. One end of the winding may be electrically connected to the other end of that winding. If a plurality of windings are shorted (e.g. in the first braking mode and/or second braking mode), then the shorting of the plurality of phases or windings may comprise forming a closed circuit in which the windings are arranged in series.

The motor may be configured such that when the controller is operating in the first braking mode a magnetic field generated by the first number of phases or windings provides a first level of braking of rotation of the rotor, and when the controller is operating in the second braking mode a magnetic field generated by the second number of phases or windings provides a second higher level of braking of the rotation of the rotor.

The controller may be configured to control the electronic circuit during the braking mode(s) such that phases or windings that are not shorted are arranged in an open circuit.

Arranging a phase or winding in an open circuit prevents a braking current flowing in that phase or winding and so prevents the phase or winding from generating a magnetic field that causes braking of the rotor.

The motor may comprise a braking resistor and the controller may be configured to control the electric circuit, in the braking mode(s), to electrically connect at least some of the phases or windings to the braking resistor for dissipating power from the braking current.

The resistor is an electronic component configured so as to dissipate the power of the braking current flowing therethrough.

The shorted phases or windings may be connected to the braking resistor.

The controller may selectively control the electric circuit to electrically connect at least some of the phases or windings to the braking resistor, for example, if a level of braking above a threshold level is being performed.

The motor may comprise a temperature sensor arranged for determining a temperature of at least one of the phases or windings, or a region proximate the at least one of the phases or windings. The controller may be configured to control the electric circuit, in the braking mode, such that (i) when a temperature determined by the temperature sensor is below a first preselected threshold value, the shorted phase(s) or winding(s) are not connected to the braking resistor, and (ii) when the temperature determined by the temperature sensor is above the preselected threshold value, the shorted phase(s) or winding(s) are connected to the braking resistor.

From a second aspect the present disclosure provides an electric motor comprising: a stator; a rotor having a magnet mounted thereto; an electric circuit comprising a plurality of phases or windings for driving rotation of the rotor when, in a drive mode, the phases or windings receive a current from an electrical power supply; and a controller configured to control the electric circuit, in a motor braking mode, to electrically disconnect the phases or windings from the electrical power supply and short at least one of said phases or windings such that the magnet is able to generate a braking current in the shorted phase or winding; wherein the motor is configured such that the rotor rotates at a first speed when the motor receives any given current from the electrical power supply, in the drive mode; and wherein the reactance of the motor is such that rotation of the rotor substantially at the first speed in said braking mode generates said braking current having an amplitude that is at or below said given current.

This aspect of the present disclosure may have any of the optional features described herein in relation to the first aspect of the present disclosure.

From a third aspect, the present disclosure provides an electric motor comprising: a stator; a rotor having a magnet mounted thereto; an electric circuit comprising a plurality of phases or windings for driving rotation of the rotor when the windings receive a current from an electrical power supply; and a controller configured to control the electric circuit, in a braking mode in which the phases or windings are electrically disconnected from the electrical power supply, to be operable in: (i) a first braking mode in which a first number of the phases or windings is, or are, shorted; and (ii) a second braking mode in which a second, greater number of the phases or windings are shorted.

The third aspect of the present disclosure may have any of the optional features described herein in relation to the first aspect of the present disclosure such as, for example, the following features.

The first number of windings is at least one winding. For example, the controller may be configured to short two windings in the first braking mode and more than two windings in the second braking mode.

The shorting of a winding may comprise forming a closed circuit that electrically connects one end of that winding to the other end of that winding, with no electric power source in that closed circuit. If a plurality of windings are shorted in the first braking mode (and/or the second braking mode), then the shorting of the plurality of windings may comprise forming a closed circuit in which the windings are arranged in series.

The magnet may be a permanent magnet.

The phases or windings may be mounted on the stator.

The motor may comprise a motor drive unit configured to be operable in a motor drive mode in which the phases or windings are electrically connected to the electrical power supply so as to receive a current and generate magnetic fields that act on a magnetic field of the magnet mounted to the rotor, thereby causing the rotor to rotate. The controller may be configured so as to not short any phases or windings in the motor drive mode. The motor drive unit is also configured to be operable in the braking mode in which the phases or windings are electrically disconnected from the electrical power supply such that the electric power supply does not supply a current to the windings, thereby not driving rotation of the rotor.

The motor may be configured such that shorting the first and/or second number of phases or windings in the first and/or second braking mode, respectively, allows a braking current to flow in these phases or windings that generates a magnetic field that interacts with a magnetic field of the magnet on the rotor so as to brake rotation of the rotor.

The motor may be configured such that when the controller is operating in the first braking mode the magnetic field generated by the first number of windings provides a first level of braking of the rotation of the rotor, and when the controller is operating in the second braking mode the magnetic field generated by the second number of windings provides a second higher level of braking of the rotation of the rotor.

The motor may comprise a braking resistor, and the controller may be configured to control the electric circuit, in the motor braking mode, to electrically connect at least some of the phases or windings to the braking resistor for dissipating power from the braking current.

The resistor is an electronic component configured so as to dissipate the power of the braking current flowing therethrough.

The shorted phases or windings may be connected to the braking resistor.

The controller may selectively control the electric circuit to electrically connect at least some of the phases or windings to the braking resistor, for example, if a level of braking above a threshold level is being performed.

The motor may comprise a temperature sensor arranged for determining a temperature of at least one of the phases or windings, or a region proximate the at least one phase or winding; and the controller may be configured to control the electric circuit, in the braking mode, such that (i) when a temperature determined by the temperature sensor is below a preselected threshold value, the shorted phases or windings are not connected to the braking resistor, and (ii) when the temperature determined by the temperature sensor is above the preselected threshold value, the shorted phases or windings are connected to the braking resistor.

The present disclosure also provides a motor system comprising any of the electric motors described herein and the electrical power supply for supplying the electric current to the phases or windings.

The present disclosure also provides an electro-mechanical actuator or an electro-hydraulic actuator as described herein.

The present disclosure also provides an aerospace (e.g. aircraft) system or vehicle comprising the motor or actuator disclosed herein. For example, the present disclosure provides a landing gear having the motor or actuator disclosed herein.

The present disclosure also provides a method of controlling the electric motor or actuator disclosed herein so as to perform the functions described herein.

The present disclosure also provides a method of controlling an electric motor or actuator comprising: providing an electric motor or an actuator as described herein; and operating the motor in a braking mode by disconnecting the phases or windings from an electrical power supply and shorting at least one of said phases or windings such that the magnet is able to generate a braking current in the shorted phases or windings; wherein the amplitude of the braking current is the same or lower than the rated current for the drive mode.

The method may further comprise operating the motor in a drive mode by connecting the phases or windings to an electrical power supply that supplies the phases or windings with a current at or below the rated current such that they drive rotation of the rotor.

The present disclosure provides a method of controlling an electric motor or actuator comprising: providing an electric motor or actuator as described herein; operating the motor in the braking mode by disconnecting the windings from an electrical power supply; and operating the controller in a first braking mode in which a first number of the phases or windings is, or are, shorted; and operating the controller in a second braking mode in which a second greater number of the phases or windings are shorted.

BRIEF DESCRIPTION OF THE DRAWINGS

Various embodiments will now be described, by way of example only, and with reference to the accompanying drawings in which.

DETAILED DESCRIPTION

Figure 1:
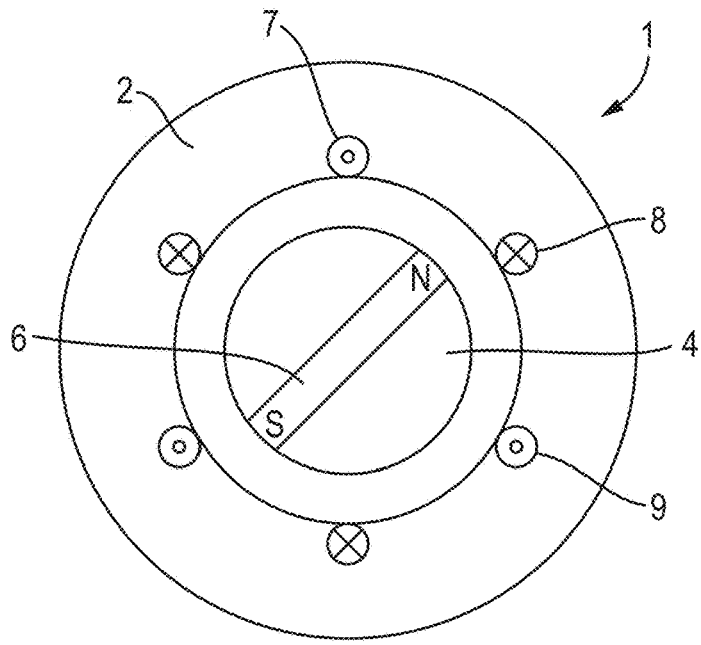
FIG. 1 shows a schematic of a part of a motor 1 according to an embodiment of the present disclosure.

FIG. 1 shows a schematic of a part of a motor 1 according to an embodiment of the present disclosure. The motor is a three-phase motor comprising a stator 2, a rotor 4, a permanent magnet 6 mounted on the rotor 4, and three phases or windings 7,8,9 (hereinafter referred to as windings) for driving rotation of a rotor. However, embodiments are contemplated in which the motor is a polyphase motor other than a three-phase motor, and/or which comprise a number of windings other than three.

Figure 2A:
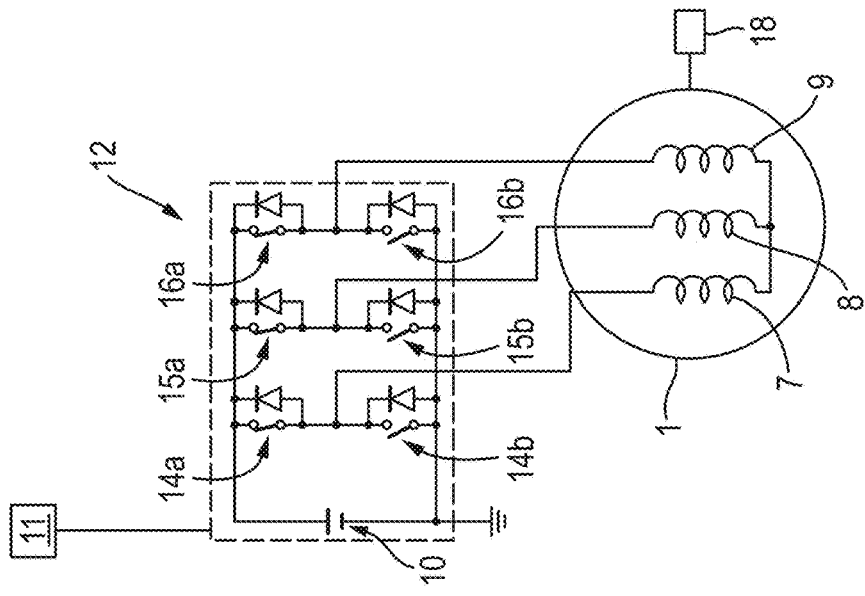
FIGS. 2A-2C show schematics of portions of the motor circuit during a mode in which the motor is not being driven and in first and second motor braking modes.
Figure 2B:
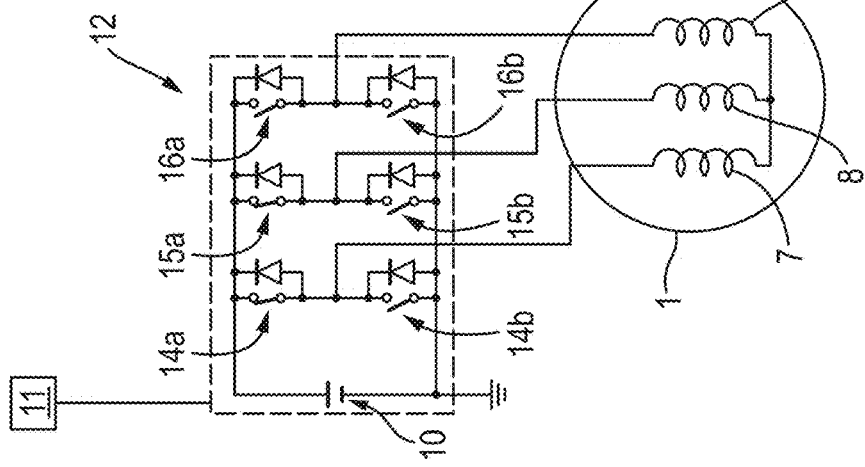
Figure 2C:
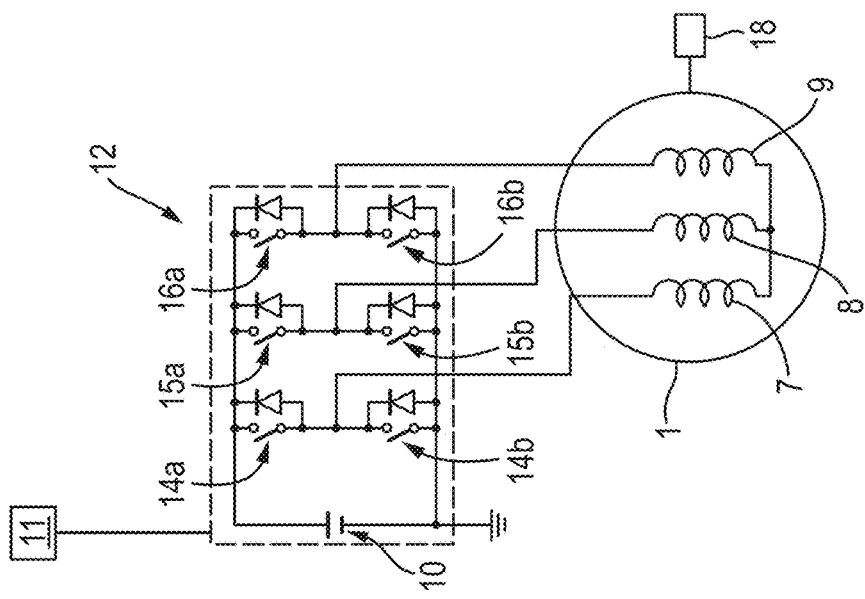

FIGS. 2A-2C show schematics of a part of a motor system for use with the motor of FIG. 1 in three different configurations. In this embodiment, the motor system includes a DC power supply 10 having a positive terminal and a relatively negative terminal (e.g. a ground terminal), three motor phases or windings 7,8,9 for driving rotation of the rotor 4 (shown in FIG. 1), and a motor drive unit 12 comprising an inverter for selectively electrically connecting the motor phases or windings 7-9 to the positive and negative terminals of the power supply 10. In the depicted embodiment the three phases or windings 7-9 are electrically connected to each other by a first end of each of the windings being connected at a common point. The second end of each of the windings is connected to the motor drive unit 12. However, other configurations are contemplated herein. For example, the motor 1 may comprise only two phases or windings or more than three phases or windings. Alternatively, or additionally, the phases or windings 7-9 may not be connected at a common point. It is also contemplated that an AC power supply may be provided that is converted to provide said DC power supply 10.

The inverter in the motor drive unit 12 comprises a plurality of switches 14-16 that are closed and opened so as to connect and disconnect the second end of each phase or winding 7-9 to and from the positive and negative terminals of the power supply 10. More specifically, the second end of each phase or winding 7,8,9 is electrically connected to the positive terminal of the power supply 10 via its own switch 14a,15a,16a, such that when the switch is closed the second end of that phase or winding is connected to the positive terminal and when the switch is opened the second end of that phase or winding is disconnected from the positive terminal. The second end of each phase or winding is also electrically connected to the negative terminal of the power supply 10 via its own switch 14b,15b,16b, such that when the switch is closed the second end of that phase or winding is connected to the negative terminal and when the switch is opened the second end of the phase or winding is disconnected from the negative terminal.

The motor system may comprise a temperature sensor 18 for sensing the temperature of part of the motor, such as one or more of the windings 7-9 or the region proximate the windings 7-9.

The motor drive unit 12 is connected to a controller 11 configured to control the opening and closing of the switches 14-16 so as to operate in a motor drive mode in which the second end of each phase or winding 7-9 is alternately connected to the positive and negative terminals, i.e. to an AC power supply. The controller 11 controls the sequence in which the switches 14-16 are opened and closed such that the second ends of different phases or motor windings 7-9 are connected and disconnected from the positive and negative terminals in a manner that is out of phase with each other. In other words, the second ends of different motor phases or windings 7-9 are supplied with AC voltages that are out of phase with each other. In the depicted embodiment the motor 1 is a three-phase motor and the switches 14-16 are controlled to open and close in a sequence such that the motor drive unit 12 provides a three-phase voltage to the motor phases or windings 7-9. As such, a potential difference is created across each phase or winding 7-9 and an electrical current flows in response thereto. These currents generate magnetic fields which act on the magnetic field of the permanent magnet 6 on the rotor 4, so as to drive rotation of the rotor 4. This operation of the motor 1 is well known and so need not be described in further detail herein.

When it is no longer desired to drive the motor 1, the controller 11 controls the motor drive unit 12 to operate in a mode in which the switches 14-16 are controlled (e.g. at least some are opened) such that the power supply 10 does not supply an electrical current to any of the phases or windings 7-9. The rotor 4 is therefore no longer driven to rotate and so its rotation slows.

FIG. 2A shows the motor system in a configuration in which all of the switches 14-16 in the inverter have been moved to the open position such that none of the phases or windings are electrically connected to the power supply 10. The rotor 4 is therefore no longer driven to rotate and so its rotation slows.

Until the rotation of the rotor 4 has come to a halt, the permanent magnet 6 on the rotor 4 continues to rotate passed the motor phases or windings 7-9. If the switches 14-16 are open and the phases or windings 7-9 do not form part of a closed circuit, this induces a potential difference across each winding 7-9.

In some applications, e.g. aerospace applications, it may be undesirable for this potential difference to generate an electrical current that passes to the electrical network connected to the motor 1 and so it is desired to dissipate the electrical power generated as the rotor 4 slows down. Conventionally this has been achieved by providing a relatively large resistor in a closed circuit with the phases or windings 7-9 such that the electrical power generated as the rotor 4 slows down is dissipated by the resistor. However, the resistor required to perform this function must be relatively large and heavy.

According to embodiments of the present disclosure, at least some of the electrical power generated as the rotor 4 slows down is dissipated by another technique, in a braking mode. That is, one or more of the phases or windings 7-9 may be shorted in the braking mode to form a closed circuit so that the potential difference (that has been induced whilst the rotor 4 slows down) generates an electrical current in the one or more shorted windings 7-9. In various embodiments, at least two of the windings 7-9 are shorted together. This may be achieved by providing a controller 11 that opens and closes various ones of switches 14-16 so that the phases or windings are shorted, thereby preventing the power supply 10 from supplying these shorted windings with current, and enabling the magnet 6 on the rotating rotor 4 to induce a braking current in the shorted windings. The electrical braking current generated by the shorted windings 7-9 generates a magnetic field that interacts with the magnetic field of the permanent magnet 6 on the rotor 4, so as to oppose rotation of the rotor 4 and cause braking of the rotor 4. This dissipates the electrical power generated as the rotor 4 slows down.

The number of phases or windings 7-9 that may be shorted so as to generate a magnetic field and braking in the above manner may be selected based on a number of factors. For example, the number of phases or windings 7-9 that may be shorted may be selected based on the amount of power desired to be dissipated and/or the level of motor braking that is desired.

FIG. 2B shows the motor system in a first braking mode in which two of the phases or windings 7,8 are shorted by closing switches 14a and 15a, and opening switches 14b and 15b. It will be appreciated that phases or windings 7,8 may alternatively be shorted by closing switches 14b and 15b, and opening switches 14a and 15a. The electrical current generated by shorting phases or windings 7-8 generates a magnetic field that interacts with the magnetic field of the permanent magnet 6 on the rotor 4, so as to oppose rotation of the rotor 4 and cause braking of the rotor 4. This dissipates the electrical power generated as the rotor 4 slows down. Switches 16a and 16b are maintained open, in this mode, such that motor phase or winding 9 is not shorted and no current is able to flow through winding 9.

It will be appreciated that two of the phases or windings may alternatively be shorted by closing switches 14a and 16a, and opening switches 14b and 16b, or by closing switches 14b and 16b, and opening switches 14a and 16a. Switches 15a and 15b are maintained open, in this mode, such that phase or winding 8 is not shorted and no current is able to flow through winding 9.

FIG. 2C shows the motor system in a second braking mode in which three phases or windings 7-9 are shorted by closing switches 14a, 15a and 16a, and opening switches 14b, 15b and 16b. It will be appreciated that phases or windings 7-9 may alternatively be shorted by closing switches 14b, 15b and 16b, and opening switches 14a, 15a and 16a. The electrical current generated by shorting three phases or windings 7-9 generates a magnetic field that interacts with the magnetic field of the permanent magnet 6 on the rotor 4, so as to oppose rotation of the rotor 4 and cause a higher level of braking of the rotor 4 than when fewer windings are shorted.

Shorting together the phases of the motor generates dynamic braking of the rotor 4, as described above. The phase resistance of the motor effectively becomes the load for the motor when it is acting as a generator (i.e. in the braking mode). This load creates a torque that decelerates the rotor 4. This may produce an exponential decay in the rotor velocity, since the load reduces the rotor speed, which causes a decrease in the voltage generated by the magnet 6 on the rotor 4 interacting with the windings 7-9 (i.e. decreases the back-EMF), which in turn decreases the current in the shorted motor phases, which decreases the load the rotor 4 has to work against.

Figure 3:
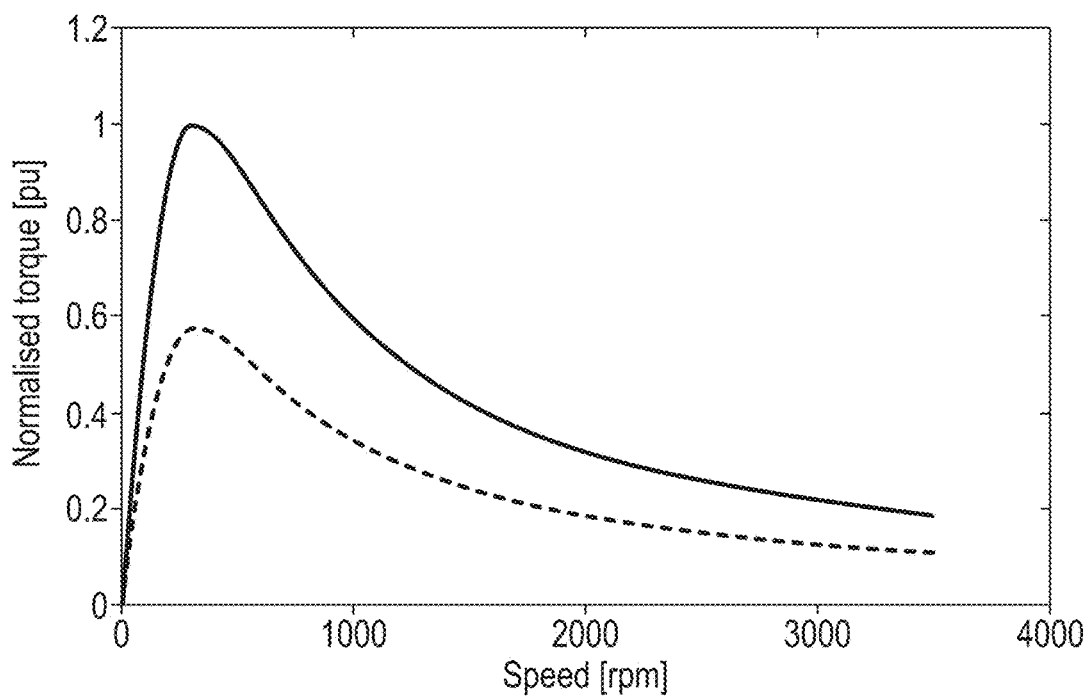
FIG. 3 shows plots of drag torque on a rotor of the motor during first and second braking modes as a function of rotor speed.

FIG. 3 shows two plots of drag torque on the rotor 4 during the above-described first and second braking modes as a function of rotor speed. The lower plot shows the drag torque as a function of rotor speed in the first braking mode when two of the phases or windings 7-9 are shorted, thus generating a first level of braking. The upper plot shows the drag torque as a function of rotor speed in the second braking mode when three of the phases or windings 7-9 are shorted, thus generating a second level of braking that is higher than the first level. The values of drag torque are normalised based on the maximum drag torque value obtained when shorting the three phases or windings 7-9. It can be seen that the drag torque is higher for all rotor speeds when three phases or windings are shorted as opposed to when two phases or windings are shorted.

Embodiments disclosed herein enable electrical power generated during the motor braking mode to be selectively dissipated within motor windings 7-9. This eliminates the need for, or reduces the size of, a braking resistor within the motor circuitry and may consequently improve the weight and/or reliability of the system. For example, as described in relation to FIG. 2A-2C, the power may primarily be dissipated by shorting the phases or windings 7-9, but one or more braking resistor may also be provided to dissipate power, e.g. if the braking requirements are particularly high (e.g. over a threshold level). The one or more braking resistor may be used whenever the braking mode is activated. Alternatively, the one or more braking resistor may be selectively used. For example, if the braking requirements are particularly high then one or more switch of the motor circuit may be activated such that the regenerated braking current passes through the one or more braking resistor. As described above, a temperature sensor 18 may be provided for sensing the temperature of part of the motor, such as one or more of the windings 7-9 or the region proximate the windings 7-9. One or more switch of the motor circuit may be activated such that the regenerated braking current passes through the one or more braking resistor when the temperature sensed by the temperature sensor 18 is above a pre-set threshold value.

As the majority of the electrical power is dissipated in the windings, as described above, the resistance and hence size and weight of the braking resistors used in the embodiments may be relatively small.

Conventionally, permanent magnet motors have a relatively low reactance and hence in such motors the electrical current regenerated in the shorted motor phases or windings, in the braking mode, would be significantly higher than the current provided by the power supply 10 in the drive mode (during some of the braking). As such, if the motor is designed to operate at a certain rated current in the drive mode, then the regenerated braking current in the braking mode would be above the rated current during some of the braking. By way of example, if the rated current for the drive mode was 2A and three motor phases were shorted in the braking mode, then the regenerated current could be 6A, which is triple the rated current that the motor is designed to operate at and would overheat and burn out the switches in the motor inverter. In order to avoid this, a conventional system would require the inverter switches to be rated for high braking currents. The motor would then have to be driven by a current below the rated current in the motor drive mode. Also, such conventional systems may have to limit the level of motor braking that is performed to avoid the braking current becoming too high.

In contrast, embodiments of the present disclosure provide the phases or windings of the motor with a relatively high reactance in order to control the regenerated braking current produced in the motor during the braking mode. The reactance may be such that the maximum regenerated braking current is about the same as the rated current of the motor for the drive mode. For example, the reactance may be at least 0.7 per unit, although maybe 1 per unit reactance.

As described above, the number of phases or windings 7-9 that are shorted (e.g. simultaneously) may be selected in order to provide the desired level of motor braking and/or power dissipation. Alternatively, or additionally, the number of phases or windings 7-9 that are shorted (e.g. simultaneously) may be selected based on the temperature within the motor 1. More specifically, as the shorted electrical current passes through a winding 7-9 it heats it. Referring back to FIGS. 2A-2B, a temperature sensor 18 may be provided for sensing the temperature of part of the motor, such as one or more of the windings 7-9 or the region proximate the windings 7-9. The windings 7-9 may then be selectively controlled by the motor drive unit 12 to be shorted or not based on the temperature sensed.

Although the present disclosure has been described with reference to various embodiments, it will be understood by those skilled in the art that various changes in form and detail may be made without departing from the scope of the inventions as set forth in the accompanying claims.

The invention claimed is:

1. An electric motor comprising:
   a stator;
   a rotor having a magnet mounted thereto;
   an electric circuit comprising a plurality of phases or windings for driving rotation of the rotor when, in a drive mode, the phases or windings receive a current from an electrical power supply; and
   a controller configured to control the electric circuit, in a motor braking mode, to electrically disconnect the phases or windings from the electrical power supply and short at least one of said phases or windings such that the magnet is able to generate a braking current in the shorted phase or winding;
   wherein the motor is configured to operate at a rated current in the drive mode and to have a reactance such that the amplitude of the braking current is the same or lower than the amplitude of the rated current;
   wherein the motor is configured such that the rotor rotates at a first speed when the motor receives any given current from the electrical power supply, in the drive mode; and wherein said reactance is such that rotation of the rotor substantially at the first speed in said braking mode generates said braking current having an amplitude that is at or below said given current.

2. The motor of claim 1, wherein the phases or windings that are shorted in said braking mode have said reactance that limits the amplitude of the braking current to being the same or lower than that of the rated current.

3. The motor of claim 2, wherein the magnet is a permanent magnet.

4. The motor of claim 1, configured such that the braking current generates a magnetic field that interacts with a magnetic field of said magnet so as to cause braking of a rotation of the rotor.

5. The motor of claim 1, configured to control the electric circuit to be operable in a first braking mode in which a first number of the phases or windings is, or are, shorted; and to be operable in a second braking mode in which a second greater number of the phases or windings are shorted.

6. The motor of claim 5, configured such that when the controller is operating in the first braking mode a magnetic field generated by the first number of phases or windings provides a first level of braking of a rotation of the rotor, and when the controller is operating in the second braking mode a magnetic field generated by the second number of phases or windings provides a second higher level of braking of the rotation of the rotor.

7. The motor of claim 1, wherein the controller is configured to control the electronic circuit during the braking mode(s) such that phases or windings that are not shorted are arranged in an open circuit.

8. The motor of claim 1, further comprising a braking resistor and wherein the controller is configured to control the electric circuit, in the braking mode(s), to electrically connect at least some of the phases or windings to the braking resistor for dissipating power from the braking current.

9. The motor of claim 1, further comprising a temperature sensor arranged for determining a temperature of at least one of the phases or windings, or a region proximate the at least one of the phases or windings;
wherein the controller is configured to control the electric circuit, in the braking mode, such that (i) when a temperature determined by the temperature sensor is below a first preselected threshold value, the shorted phase(s) or winding(s) are not connected to the braking resistor, and (ii) when the temperature determined by the temperature sensor is above the preselected threshold value, the shorted phase(s) or winding(s) are connected to the braking resistor.

10. An electro-hydraulic actuator comprising:
a motor as claimed in claim 1; and
a mechanical load coupled to the rotor.

11. An electro-mechanical actuator comprising:
a motor as claimed in claim 1; and
a mechanical load coupled to the rotor.

12. An electric motor comprising:
a stator;
a rotor having a magnet mounted thereto;
an electric circuit comprising a plurality of phases or windings for driving rotation of the rotor when the windings receive a current from an electrical power supply; and
a controller configured to control the electric circuit, in a braking mode in which the phases or windings are electrically disconnected from the electrical power supply, to be operable in: (i) a first braking mode in which a first number of the phases or windings is, or are, shorted; and (ii) a second braking mode in which a second, greater number of the phases or windings are shorted.

13. The motor of claim 12, configured such that when the controller is operating in the first braking mode the magnetic field generated by the first number of windings provides a first level of braking of the rotation of the rotor, and when the controller is operating in the second braking mode the magnetic field generated by the second number of windings provides a second higher level of braking of the rotation of the rotor.

14. An electro-hydraulic actuator comprising:
a motor as claimed in claim 12; and
a mechanical load coupled to the rotor.

15. An electro-mechanical actuator comprising:
a motor as claimed in claim 12; and
a mechanical load coupled to the rotor.

16. An electric motor comprising:
a stator;
a rotor having a magnet mounted thereto;
an electric circuit comprising a plurality of phases or windings for driving rotation of the rotor when, in a drive mode, the phases or windings receive a current from an electrical power supply; and
a controller configured to control the electric circuit, in a motor braking mode, to electrically disconnect the phases or windings from the electrical power supply and short at least one of said phases or windings such that the magnet is able to generate a braking current in the shorted phase or winding;
wherein the motor is configured to operate at a rated current in the drive mode and to have a reactance such that the amplitude of the braking current is the same or lower than the amplitude of the rated current; and
wherein the phases or windings that are shorted in said braking mode have said reactance that limits the amplitude of the braking current to being the same or lower than that of the rated current.

* * * * *